United States Patent
Ray et al.

(10) Patent No.: US 8,141,129 B2
(45) Date of Patent: Mar. 20, 2012

(54) CENTRALLY ACCESSIBLE POLICY REPOSITORY

(75) Inventors: Kenneth D. Ray, Seattle, WA (US); Keith S. Brintzenhofe, Redmond, WA (US); Rushmi U. Malaviarachchi, Redmond, WA (US); Scott C. Cottrille, Sammamish, WA (US); Gregory Kostal, Kirkland, WA (US); Vladimir Yarmolenko, Duvall, WA (US); Abhijat Kanade, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 718 days.

(21) Appl. No.: 12/129,577

(22) Filed: May 29, 2008

(65) Prior Publication Data

US 2009/0300706 A1    Dec. 3, 2009

(51) Int. Cl.
    H04L 29/06    (2006.01)
(52) U.S. Cl. ............... 726/1; 726/26; 709/229; 705/59
(58) Field of Classification Search ............... 726/1, 26; 709/229; 705/59
    See application file for complete search history.

(56) References Cited

U.S. PATENT DOCUMENTS

| | | | |
|---|---|---|---|
| 6,584,454 B1 | 6/2003 | Hummel, Jr. et al. | |
| 6,718,380 B1 | 4/2004 | Mohaban et al. | |
| 7,165,174 B1 | 1/2007 | Ginter et al. | |
| 7,716,240 B2 * | 5/2010 | Lim | 707/781 |
| 2002/0188568 A1 | 12/2002 | Nickolaisen et al. | |
| 2003/0046407 A1 * | 3/2003 | Erickson et al. | 709/229 |
| 2004/0003139 A1 | 1/2004 | Cottrille et al. | |
| 2004/0117407 A1 * | 6/2004 | Kumar et al. | 707/200 |
| 2004/0225896 A1 * | 11/2004 | Ng | 713/201 |
| 2005/0004873 A1 * | 1/2005 | Pou et al. | 705/51 |
| 2006/0053079 A1 * | 3/2006 | Edmonson et al. | 705/59 |
| 2006/0053080 A1 * | 3/2006 | Edmonson et al. | 705/59 |
| 2006/0075467 A1 * | 4/2006 | Sanda et al. | 726/1 |
| 2007/0118878 A1 | 5/2007 | Sastry et al. | |
| 2007/0143855 A1 * | 6/2007 | Gilchrist et al. | 726/26 |
| 2007/0153814 A1 | 7/2007 | Canning et al. | |
| 2007/0156670 A1 * | 7/2007 | Lim | 707/4 |
| 2007/0156696 A1 * | 7/2007 | Lim | 707/9 |
| 2007/0156897 A1 * | 7/2007 | Lim | 709/225 |
| 2007/0157288 A1 | 7/2007 | Lim | |
| 2007/0180490 A1 * | 8/2007 | Renzi et al. | 726/1 |
| 2008/0060080 A1 * | 3/2008 | Lim | 726/26 |
| 2008/0066148 A1 * | 3/2008 | Lim | 726/1 |
| 2008/0301760 A1 * | 12/2008 | Lim | 726/1 |
| 2009/0288135 A1 * | 11/2009 | Chang et al. | 726/1 |
| 2010/0122318 A1 * | 5/2010 | Hu | 726/1 |

OTHER PUBLICATIONS

Liesegang, Christian, et al., "Enforce: Policy Enforcement", ORKA—Organizational Control Architecture, 2006, 47 pages.
Kardasis, P., et al., "Expressing and organising business rules", Information and Software Technology, vol. 46, Issue 11, Sep. 1, 2004, 1 page.
ILOG, "ILOG and IBM Resources", 2007, 2 pages.
Windows Rights Management Services, "Information Protection Technology", 2005, 2 pages.

* cited by examiner

Primary Examiner — Nabil El Hady
(74) Attorney, Agent, or Firm — Workman Nydegger (57) ABSTRACT

The present invention extends to methods, systems, and computer program products for a centrally accessible policy repository. Protection policies for protecting resources within an organization are stored at a central policy repository. Thus, an administrator can centrally create, maintain, and manage resource protection polices for all of the organizational units within an organization. Accordingly, resources consumed when performing these protection policy related operations is significantly reduced. Additionally, since protection policies are centrally located, there is increased likelihood of being able to consistently apply an organization's protection policies within different organizational units, even when protection policies change.

17 Claims, 4 Drawing Sheets

CENTRALLY ACCESSIBLE POLICY REPOSITORY

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic content. Accordingly, the performance of many computing tasks are distributed across a number of different computer systems and/or a number of different computing components.

Nonetheless, although electronic content may be accessible to a number of computer systems, the creator of the electronic content may desire to limit access to the electronic data. In some environments, one or more access mechanisms, such as, for example, password protection, setting file attributes, (e.g., read-only, etc.), firewalls, etc., can be used to limit access to electronic content. These mechanisms provide essentially the same level of electronic content access to anyone who is authorized. However, if a user can access a file, there is typically no limitation on what that can do with the contents of a file. For example, if a user can read a file, the user can copy the file to another location in which others may be able to access the file, the user can print the file and leave a hardcopy somewhere, etc, typically with no limitations.

As a result, in some environments, a creator of electronic content may desire more configurable and/or granular access control to their electronic content. In these other environments, a content creator can use Digital Rights Management (DRM) to control access to their electronic content. DRM generally includes access control technologies used by content creators to limit usage of electronic content (or instances thereof). Thus, various different types of DRM have been developed to protect different types of electronic content, such as, for example, pictures, movies, videos, music, programs, multi-media, games, documents, etc.

One category of DRM, Enterprise Rights Management (ERM) is often used to control access to documents, such as, for example, electronic mail messages, Word processing documents, and Web pages, etc. Rights Management Services (RMS) is an ERM solution. RMS can be used to encrypt documents, and through server-based policies, prevent the documents from being decrypted except by specified people or groups, in certain environments, under certain conditions, and for certain periods of time. Document based operations like printing, copying, editing, forwarding, and deleting can be allowed or disallowed for individual documents. RMS administrators can deploy RMS templates that group these rights together into predefined policies that can be applied en masse to content.

Accordingly, RMS-protected content can be created by RMS-enabled applications. RMS-protected content is encrypted and can contain an embedded Usage Policy, which defines the rights each user or group has to the content. An RMS system works by assigning rights to trusted entities, which are either single users or groups of users. Rights are assigned on a per-entity basis. RMS defines and recognizes several rights by default—such as permission to read, copy, print, save, forward, and edit—and can be extended to recognize additional rights (which each application would have to explicitly implement).

To protect content, a user specifies a usage policy that is to apply to the content. The user then submits the content and usage policy to an RMS-enabled application that applies the usage policy to the content. Although users can (with sufficient technical expertise) create their own usage polices from scratch, users more typically access pre-created usage policy templates that define a usage policy. For example, a user can request a usage policy template from an RMS server. The usage policy is then attached to the document. When a user requests access to the content, the usage policy is evaluated to determine access rights for the user.

Accordingly, the use of RMS (or other DRM mechanisms), has become increasingly popular in the business setting to protect proprietary or confidential information within a business network. For example, a CEO of a large corporation may wish to distribute an e-mail that includes trade-secrets. Because of the confidential nature of this information, however, the CEO may wish to limit the actions recipients may take in regard to this message. For example, the CEO may wish to allow upper-level management to read, copy, print and save the confidential information; however, she may wish to limit other employees to read-only access or to no access at all. Accordingly, through the use of RMS the CEO can specify who is authorized to view the protected message and what actions they may take in regards thereto.

However, within many organizations (e.g., businesses), content usage policies (e.g., included in templates) are distributed and spread out across a number of RMS servers. In this environment, different sub-organizations (e.g., divisions, departments, etc) within an organization typically obtain content usage policies from different RMS servers. This distributed nature of content usage policies results in a number of problems in applying and maintaining content usage policies.

At least one problem is the difficulty in defining the content usage polices. For example, an organization may have organization-wide polices applicable to any content published within the organization. To make organization-wide policies available, the organization-wide policies must be pushed out to any and all RMS servers within the organization. Thus, an administrator is required to individually access each RMS server and update organization-wide polices at the RMS server. Based on the number of RMS servers within an organization, individually accessing and updating RMS servers can place a strain on administrator resources. Further, the frequency of change for organization-wide policy can also increase the strain on administrator resources (independent of the actually number of RMS servers).

Further, different sub-organizations within an organization may have other specific polices configured to alter and/or supplement the organization wide policies. Sub-organization policies can be beneficial since they permit sub-organizations (divisions, departments, etc.) to meet their specific policy requirements without impacting an entire organization. For example, an accounting department may have accounting specific requirements that are not applicable to the rest of an organization. Accordingly, the accounting department can configure accounting policies to meet the accounting specific requirements, without forcing the accounting policies on other portions of the organization.

In some environments, creation and control of sub-organizations is distributed out to the sub-organizations themselves (e.g., different sub-organizations may control their own RMS server). Unfortunately, distributed creation and maintenance of policies can result in the creation of potentially unwanted, unapproved, non-compliant, etc., policies. To verify that sub-organizations use only approved, compliant policies, an administrator may be required to access the a number of RMS servers (e.g, for each sub-organization) and review any organization polices. The administrator can remove any unapproved, non-complaint, etc. usage polices that are identified. Thus, in some environments, an administrator is in part relegated to policing content usage polices. Accordingly, the availability of the administrator to perform other computer and network related duties is reduced.

In some environments an administrator may restrict creation and maintenance of polices to authorized personnel. However, the authorized personnel must still access each RMS server to create and maintain organization policies and any sub-organization specific polices. Thus, in some organizations administration duties can be distributed across sub-organizations. As such, there is always some chance that (e.g., content usage) polices can become inconsistent. For example, if a content usage policy is changed after content has been protected using the content usage policy, users can be afforded or limited to inappropriate access to the document.

BRIEF SUMMARY

The present invention extends to methods, systems, and computer program products for a centrally accessible policy repository. An organization includes a central policy database. The central policy database stores the organization's policies for protecting the organization's resources. The central policy database includes a plurality of centrally accessible policy items. Some of the plurality of centrally accessible policy items contain a protection policy. The protection policy can be applied to a resource to consistently protect the resource when the resource is transferred between and utilized at other computer systems (or used at the same computer system). At least one of the plurality of centrally accessible policy items contains a policy selection policy. The policy selection policy indicates how to identify at least one protection policy that is to be applied to a resource to consistently protect the resource when the resource is transferred between and utilized at other computer systems (or used at the same computer system).

In some embodiments, a computer system accesses an indication that a specified resource of the organization is to be protected. The computer system accesses policy context data for the specified resource. The policy context data indicates the context for protecting the specified resource. The computer system accesses a policy selection policy from the central policy database for the organization. The policy selection policy indicates protection polices within the central policy database that can be applied to a resource based on the policy context data for the resource. Thus, protection polices are consistently applied to resources of the organization when the resources of the organization are utilized.

The computer system identifies one or more appropriate protection policies to apply to the specified resource based on the indications in the policy selection policy and based on the accessed policy context data. The computer system receives a selection of at least one of the one or more appropriate protection polices to apply to the specified resource.

The computer system can then protect the resource in accordance with the specified protection policy to provide consistent protection to the accessed resource across the plurality of computer systems. Alternately, the computer system can send the specified protection policy to another computer system that is to protect the resource. The other computer system can then protect the resource in accordance with the specified protection policy. In either case, a handle to the specific protection policy is attached to the resource such that other receiving computer systems can access the specified protection policy from the central policy repository. Accordingly, other computer systems can also consistently protect the resource in accordance with the specified protection policy during subsequent access to the resource.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for a centrally accessible policy repository. An organization includes a central policy database. The central policy database stores the organization's policies for protecting the organization's resources. The central policy database includes a plurality of centrally accessible policy items. Some of the plurality of centrally accessible policy items contain a protection policy. The protection policy can be applied to a resource to consistently protect the resource when the resource is transferred between and utilized at other computer systems (or utilized at the same computer system). At least one of the plurality of centrally accessible policy items contains a policy selection policy. The policy selection policy indicates how to identify at least one protection policy that is to be applied to a resource to consistently protect the resource when the resource is transferred between and utilized at other computer systems (or utilized at the same computer system).

In some embodiments, a computer system accesses an indication that a specified resource of the organization is to be protected. The computer system accesses policy context data for the specified resource. The policy context data indicates the context for protecting the specified resource. The computer system accesses a policy selection policy from the central policy database for the organization. The policy selection policy indicates protection polices within the central policy database that can be applied to a resource based on the policy context data for the resource. Thus, protection polices are consistently applied to resources of the organization when the resources of the organization are utilized.

The computer system identifies one or more appropriate protection policies to apply to the specified resource based on the indications in the policy selection policy and based on the accessed policy context data. The computer system receives a selection of at least one of the one or more appropriate protection polices to apply to the specified resource.

The computer system can then protect the resource in accordance with the specified protection policy to provide consistent protection to the accessed resource across the plurality of computer systems. Alternately, the computer system can send the specified protection policy to another computer system that is to protect the resource. The other computer system can then protect the resource in accordance with the specified protection policy. In either case, a handle to the specific protection policy is attached to the resource such that other receiving computer systems can access the specified protection policy from the central policy repository. Accordingly, other computer systems can also consistently protect the resource in accordance with the specified protection policy during subsequent access to the resource.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

With this description and following claims, a "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1A:
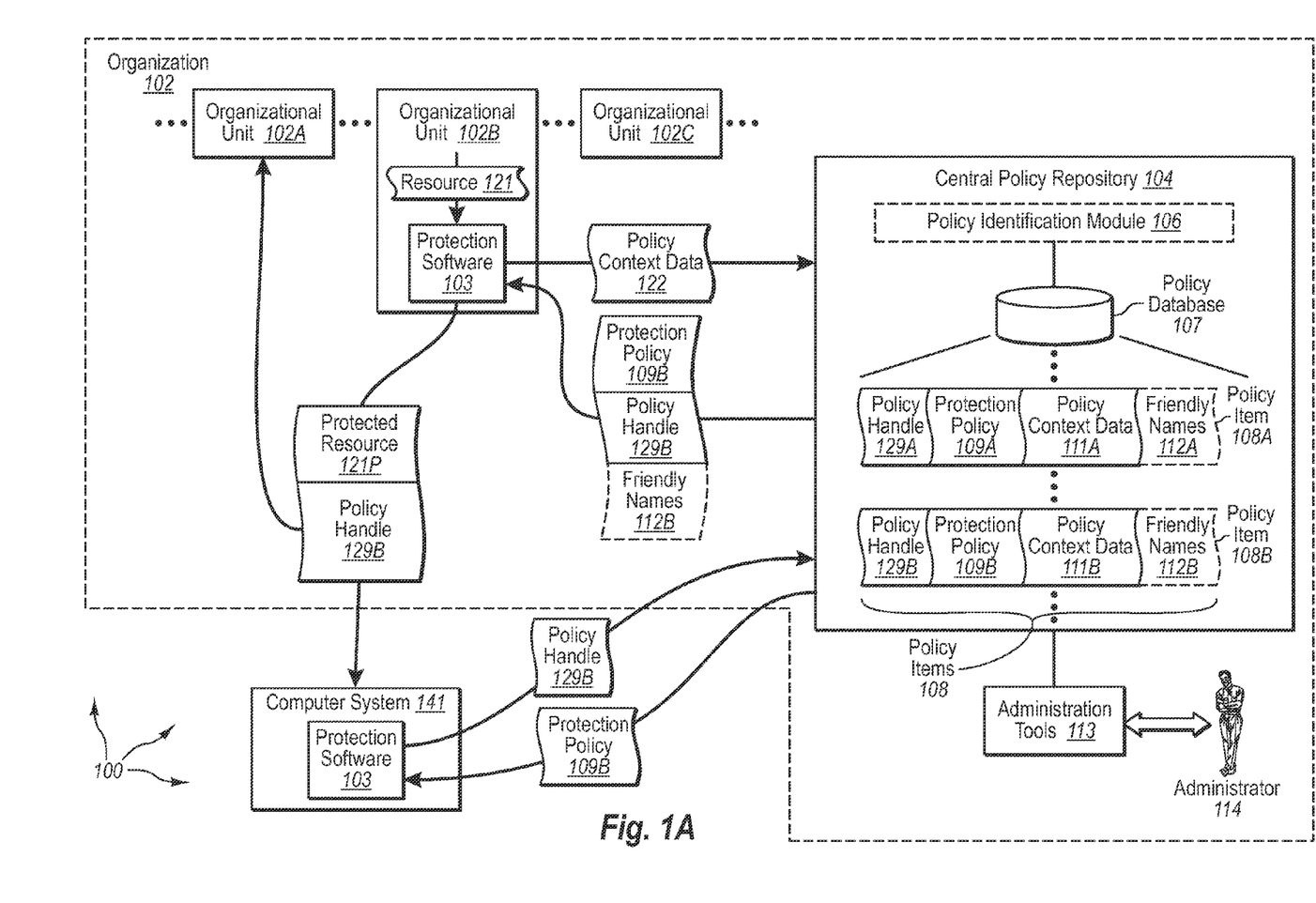
FIG. 1A illustrates a view of an example computer architecture that facilitates resource protection using a centrally accessible policy repository.

FIG. 1 illustrates an example computer architecture 100 that facilitates using a centrally accessible policy repository to protect resources. As depicted, computer architecture 100 includes a variety of components of organization 102, including organizational units 102A, 102B, and 102C and central policy repository 104. Computer architecture 100 also includes computer system 141 that is external to organization 102. Each of the depicted components can be connected to one another over a system bus and/or over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Within organization 102, each of the organization units 102A, 102B, 102C, etc., can represent some portion of the resources of organization 102, such as, for example, within a business department, within a business division, a subsidiary, etc. Central policy repository 104 provides a centrally accessible location that stores policies for organization 102. Any computer system (either internal or external to organization 102) that receives instructions to protect content related to organization 102 or that receives instructions to access protected content related to organization 102 can locate relevant policies from central policy repository 104.

As depicted, central repository 104 includes policy database 107. Alternately, database 107 can be located at a physically separate computer system or set of computer systems. Generally, policy database 107 is configured as a centrally accessible location that stores any policies, such as, for example, protection policies and classification policies, for use within organization 102. Policies stored in policy database 107 can be applied to consistently protect resources of organization 102. A resource can be of a variety of different types including an edge resource (e.g., firewalls, ipsec, virtual private networks, etc.), an application or service (e.g., ports and services of composite applications), storage (e.g., file systems, file shares, etc). More particularly, in some embodiments, a resource is a file, an electronic message, multi-media content, a document, a Web page, a directory, or a Web service.

Protection policies can include any of a number of different polices. For example, Digital Rights Management ("DRM") policies can be stored in policy database 107. Basic file access policies can be stored in policy database 107. Cloud service polices can be stored in policy database 107. Document management polices can be stored in policy database 107.

In some embodiments, policies in policy database 107 are stored and edited in compatible formats used by protection software. For example, it may be that the format of protection policy 109B is compatible with protection software 103. In other embodiments, policies in policy database 107 are stored and edited in other formats. The central policy repository processes the stored format to generate a compatible format to return to a requesting computer system. For example, policy items can include executable code. The executable code can be executed to derive compatibly formatted policies to return to other computer systems.

As depicted, policy database includes policy items 108A, 108B, etc. Each policy item can include a policy handle, a protection policy, policy context data, and optionally one or more friendly names. For example, policy item 108A includes policy handle 129A, protection policy 109A, policy context data 111A, and friendly names 112A. Similarly, policy item 108B includes policy handle 129B, protection policy 109B, policy context data 111B, and friendly names 112B.

A policy handle provides a mechanism for indirectly pointing back to a policy in policy database 107. For example, policy handle 129A points to protection policy 109A. Thus, policy handle 129A can be attached to a resource to cause a computer system to access protection policy 109A as the protection policy for the resource. Accordingly, a policy handle can point a computer system to appropriate protection policy even when the protection policy changes over time. For example, administrator 114 can use administrator tools 113 to modify protection policy 109A. However, since computer systems can use policy handle 129A to access protection policy 109A from policy database 107 (instead of attaching a version of protection policy 109A to a resource) any modifications to protection policy 109A are provided to the computer systems.

Policy context data indicates a context in which it may be appropriate to protect a resource in accordance with a corresponding protection policy. Policy context data can be used to identify the protection policy of a policy item as the protection policy that is to be applied to a resource. For example, under the context indicated in policy context data 111A, protection policy 109A can be identified as the protection policy to apply to a resource. Policy context data can be based on a variety of different data, such as, for example, a resource itself, user and group identities, application type, machine health, roles, document class, etc.

Friendly names can be used to better indicate what a protection policy is to a user. For example, friendly names can include "confidential", "division source code", "document retention policy", etc. When multiple protection policies are appropriate for a resource, a user can refer to the friendly names to determine what protection polices are applicable and select one or more of the protection policies for application to the resource.

Generally, policy identification module 106 is configured to identify an appropriate and/or corresponding protection policy in response to receiving protection policy identification data, such as, for example, policy context data or a policy handle. For example, in some embodiments, policy identification module 106 receives a policy handle from another computer system. In response, policy identification module 106 scans policy items for a matching policy handle. When a match is identified, the corresponding protection policy can be returned.

In other embodiments, policy identification module 106 receives resource context data from another computer system. In response, policy identification module 106 scans policy items for any matching policy context data. When a match is identified, the corresponding protection policy can be returned. Received policy context data can match a plurality of policy items. Thus, in response to receiving policy context data, policy identification module 106 can return a plurality of protection policies (and corresponding friendly names).

Figure 2:
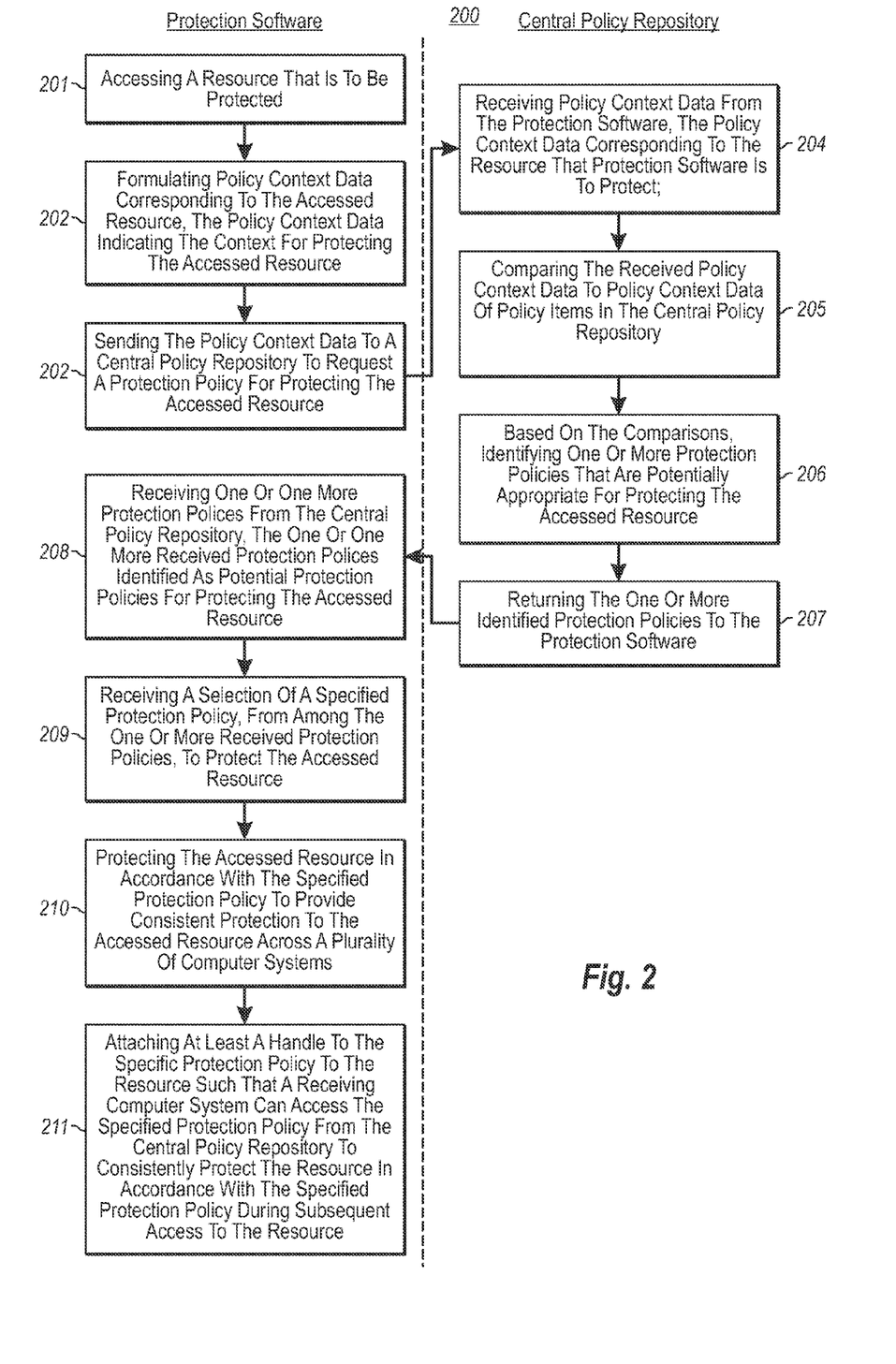
FIG. 2 illustrates a flow chart of an example method for protecting a resource using a centrally accessible policy repository.

FIG. 2 illustrates a flow chart of an example method for protecting a resource using a centrally accessible policy repository. Method 200 will be described with respect to the components and data of computer architecture 100 depicted in FIG. 1A.

Method 200 includes an act of accessing a resource that is to be protected (act 201). For example, protection software 103 can access resource 121. Protection software 103 can be located at a computer system within organizational unit 102B. Method 200 includes an act of formulating content context data corresponding to accessed resources, the content context data indicating the context for protecting accessed resources (act 202). For example, protection software 103 can formulate policy context data 122 corresponding to resource 121. Policy context data 122 indicates the context for protecting resource 121.

Method 200 includes an act of sending the policy context data to a central repository to request a protection policy for protecting the accessed resource (act 203). For example, protection software 103 can send policy context data 122 to central repository 104. Method 200 includes an act of receiving policy context data from the content protection software, the policy context data corresponding to the resources that protection software is to protect (act 204). For example, central policy repository 104 can receive policy context data 122 from protection software 103.

Method 200 includes an act of comparing the received policy context data to policy context data of policy items in the central repository (act 205). For example, policy identification module 106 can compare policy context data 122 to policy context data 111A, policy context data 111B, etc.

Method 200 includes an act of, based on the comparisons, identifying one or more protection policies that are potentially appropriate for protecting the accessed resource (act 206). For example, policy identification module 106 can identify protection policy 109B as potentially appropriate for protecting resource 121. Identifying a protection policy as appropriate can include determining that there is some requisite similarity between received policy context data and policy context data contained in the corresponding policy item. Thus, policy identification module 106 can identify a plurality of protection policies that are potentially appropriate. For example, policy identification module 106 can determine that there is some requisite similarly between policy context data 122 and policy context data 111B. Accordingly, policy identification module 106 can identify protection policy 109B as potentially appropriate for protecting resource 121. Other protection policies can be similarly identified.

Method 200 includes an act of returning the one or more identified protection policies to the protection software (act 207). For example, central repository 104 can return protection policy 109B and policy handle 129 (possibly along with friendly names 112B) to protection software 103. Central policy repository 104 can also return any other identified protection policies (possibly along with their corresponding friendly names) to protection software 103. Method 200 includes an act of receiving one or one more protection polices from the central repository, the one or one more received protection polices identified as potential protection policies for protecting the accessed resource (act 208). For example, protection software 103 can receive protection policy 109B (possible along with friendly names 112B) form central policy repository 104. Protection software 103 can also receive any other identified protection polices (possibly along with their corresponding friendly names) from central policy repository 104.

Method 200 includes an act of selecting a specified protection policy, from among the one or more received protection policies, to protect the accessed content (act 209). For example, protection software 103 can select protection policy 109B to protect resource 121. Alternately, protection software 103 can present a user-interface (e.g., using friendly names) listing any potential protection polices for protecting resource 121. A user can then enter a selection at the user-interface to select protection policy 109B (or some other presented protection policy).

Protection polices are not necessarily mutual exclusive of one another. Thus, in some embodiments protection software 103 or a user can select a plurality of protection policies to apply to resource 121.

Method 200 includes an act of protecting the accessed resource in accordance with the specified protection policy to provide consistent protection to the accessed resource across a plurality of computer systems (act 210). For example, protection software 103 can protect resource 121 in accordance with protection policy 109B (and any other selected protection policies) to provide consistent protection of resource 121 across computer systems of organization 102, as well as external computer systems, such as, for example, computer system 141. The protected version of resource 121 is depicted as protected resource 121P.

Method 200 includes an act of attaching at least a handle to the specific protection policy to the resource such that a receiving computer system can access the specified protection policy from the central repository to consistently protect the resource in accordance with the specified protection policy during subsequent access to the resource (act 211). For example, protection software 103 can attach policy handle 129B to protected resource 121P. Accordingly, a receiving computer system can use policy handle 129B to access protection policy 109B from central policy repository 104. The receiving computer system can then protect resource 121P in accordance with protection policy 109B. Policy handles for any other applied protection policies can also be attached to protected resource 121P.

For example, computer system 141 can subsequently access protected resource 121P. Protection software 143 can submit policy handle 129B (and any other handles) to central policy repository 104. Policy identification module 106 can use policy handle 129B (and any other handles) to identify protection policy 109B (and any other protection policies). Central policy repository 104 can then return protection policy 109B (and any other protection policies) to computer system 141. Protection software 143 can handle protected resource 121P in accordance with protection policy 109B (and any other returned protection policies).

Figure 1B:
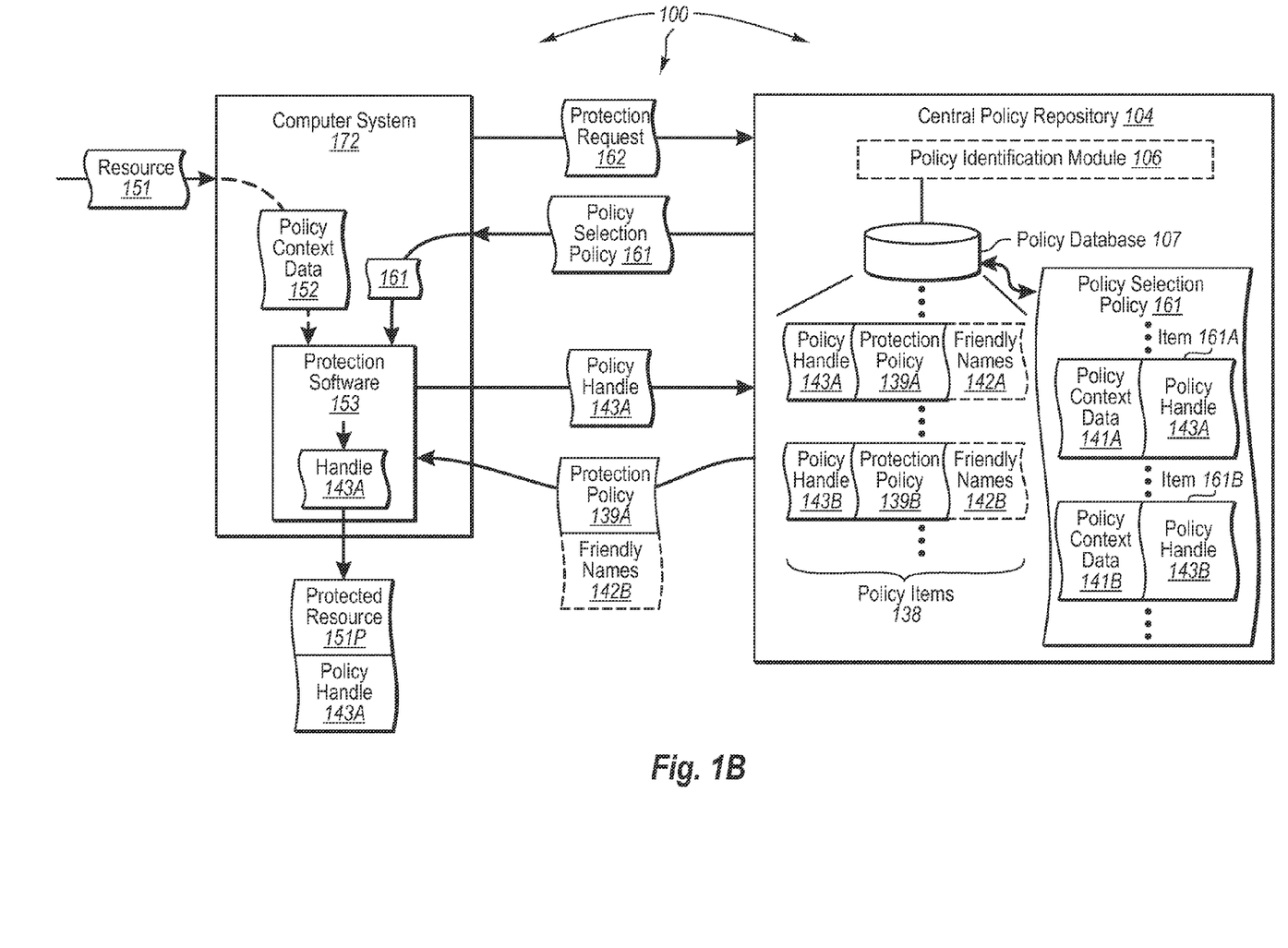
FIG. 1B illustrates another view of the example computer architecture that facilitates resource protection using a centrally accessible policy repository.

In some embodiments, protection software outside of a central policy repository processes policy context data to identify one or more appropriate protection policies for a resource. For example, FIG. 1B illustrates another view of the example computer architecture that facilitates resource protection using a centrally accessible policy repository. As depicted, FIG. 1B includes computer system 172 which can be a computer system either internal or external to organization 102.

As further depicted, policy database 107 includes policy items 138. Each policy item includes a policy handle, a protection policy, and friendly names. For example, policy item 138A includes policy handle 143A, protection policy 139A, and friendly names 142A. Similarly, policy item 138B includes policy handle 143B, protection policy 139B, and friendly names 142B.

Policy database 107 also includes policy selection policy 161. Each item within policy selection policy 161 maps policy context data to a corresponding policy handle. For example, item 161A maps policy context data 141A to policy handle 143A (the policy handle for protection policy 139A). Similarly, item 161B maps policy context data 141B to policy handle 143B (the policy handle for protection policy 139B). Policy identification module 106 or some other computer system, such as, for example, computer system 172, can use policy selection policy 161 to select one or more potentially appropriate protection policies for use in protecting a resource.

Figure 3:
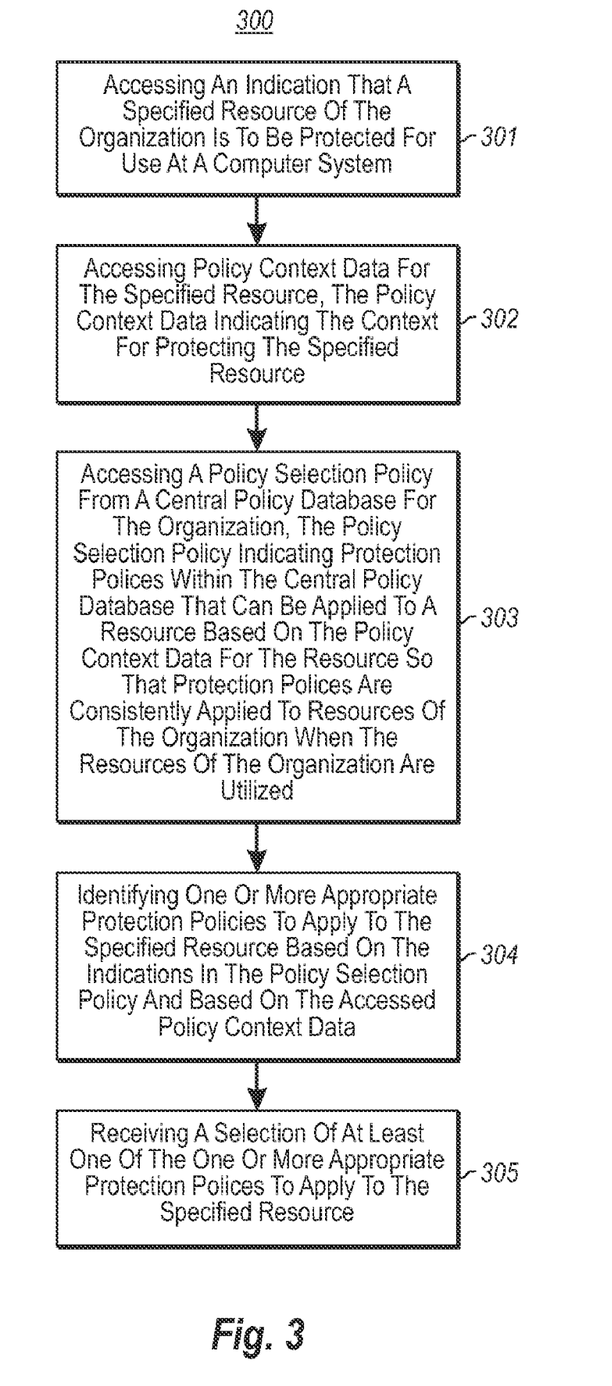
FIG. 3 illustrates a flow chart of an example method for determining how to protect a resource using a centrally accessible policy repository.

FIG. 3 illustrates a flow chart of an example method 300 for determining how to protect a resource using a centrally accessible policy repository. Method 300 will be described with respect to the components and data of computer architecture 100 depicted in FIG. 1B.

Method 300 includes an act of accessing an indication that a specified resource of the organization is to be protected for use at a computer system (act 301). For example, computer system 172 can access an indication that resource 151 is to be protected. Resource 151 can be a resource of organization 102. The indication can be trigged by an event, for example, triggered through human interaction or automated by software. For example, the indication can be implied from receiving resource 151 or from some express (human or automated) indication that resource 151 is to be protected. Method 300 includes an act of accessing policy context data for the specified resource, the policy context data indicating the context for protecting the specified resource (act 302). For example, protection software 153 can formulate policy context data 152 for resource 151. Policy context data 152 indicates the context for protecting resource 151.

Method 300 includes an act of accessing a policy selection policy from a central policy database for the organization, the policy selection policy indicating protection polices within the central policy database that can be applied to a resource based on the policy context data for the resource so that protection polices are consistently applied to resources of the organization when the resources of the organization are utilized (act 303). For example, computer system 172 can send protection request 162 to central policy repository 104. In response to protection request 162, central policy repository 104 can return policy selection policy 161 to computer system 172. Policy selection policy 161 indicates policy handles for accessing protection policies stored in policy database 107. The protection policies stored in policy database 107 can be applied to resource 151 based on policy context data 152 so that protection polices are consistently applied to resource 151 when resource 151 is utilized.

Method 300 includes an act of identifying one or more appropriate protection policies to apply to the specified resource based on the indications in the policy selection policy and based on the accessed policy context data (act 304). For example, protection software 153 can identify one or more appropriate protection policies to apply to resource 151 based on the indications in policy selection policy 161 and policy context data 152. As depicted, protection software 153 identifies handle 143A (to protection policy 139A).

Protection software 153 can compare policy context data 152 to policy context data 141A, 141B, etc. Identifying a protection policy as appropriate can include determining that there is some requisite similarity between received policy context data and policy context data contained in the corresponding item. Thus, protection software 153 can identify a plurality of protection policies that are potentially appropriate. For example, protection software 153 can determine that there is some requisite similarity between policy context data 152 and policy context data 139A. Accordingly, protection software 153 can identify policy handle 143A (to protection policy 139A) as potentially appropriate for protecting resource 151. Other protection policies can be similarly identified.

Method 300 includes an act of receiving a selection of at least one of the one or more appropriate protection polices to apply to the specified resource (act 305). For example, protection software 153 can send policy handles for any potentially appropriate protection policies to central policy repository 104. As depicted, protection software 153 sends policy handle 143A to central policy repository 104. In response, central policy repository 104 can return corresponding protection policies (and friendly names) to protection software 153. As depicted, central policy repository 104 returns protection policy 139A along with friendly names 142B to protection software 153.

Protection software 153 can present a list of any potentially appropriate protection policies (e.g., by friendly names) at a user-interface of computer system 172. The user-interface can receive user selections of one or more protection policies that are to be used to protect resource 151. Alternately, protection software 153 can automatically select one or more protection policies that are to be used to protect resource 151.

Any selected protection policies can be applied to the resource 151 to protect resource 151. The protected version of resource 151 is depicted as protected resource 151P. Policy handles for protection policies used to protect protected resource 151P can be attached to protected resource 151P. The attachment of policy handles permits other computer systems utilizing protected resource 151P to more easily access appropriate protection policies and utilize protected resource 151P in accordance with the appropriate protection policies.

In some embodiments, policy identification module 106 uses policy selection policy 161 to identify potentially appropriate protection policies for protecting a resource based on received policy context data. Thus, policy selection policy 161 can be utilized at a computer system where protected content is to be processed or at central policy repository 104.

Embodiments of the present invention facilitate central storage of an organization's policies. Thus, an administrator can centrally create, maintain, and manage resource protection polices for all of the organizational units within an organization. Accordingly, resources consumed when performing these protection policy related operations is significantly reduced. Additionally, since protection policies are centrally located, there is increased likelihood of being able to consistently apply an organization's protection policies within different organizational units, even when protection policies change.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:
1. One or more computer storage devices having stored thereon computer executable instructions that, when executed by one or more processors of a computer system, cause the computer system to implement a method for using a central policy database to consistently protect resources, the method comprising:
  an act of accessing a resource comprising a file;
  an act of determining that the file lacks policy data;
  based on determining that the file lacks policy data, an act of formulating resource context data specifying one or more properties of the file;
  an act of sending the resource context data to a central policy database to request policy data for protecting the file, the central policy database storing a plurality of centrally accessible policy items, at least one of the plurality of centrally accessible policy items comprising:
    a protection policy that instructs protection software how to protect one or more resources to which the at least one centrally accessible policy item applies;
    a policy handle that points to the protection policy so that the protection software can access to the protection policy from the central policy database based on the policy handle; and
    policy context data that indicates one or more resource contexts in which a particular resource is one of the one or more resources to which the at least one centrally accessible policy item applies;

an act of receiving both the protection policy and the policy handle corresponding to the at least one centrally accessible policy item from the central policy database, based on a policy identification module at the central policy database comparing the resource context data with the policy context data of the at least one centrally accessible policy item and determining from the comparison that the resource context data includes at least one context indicating that the file is one of the one or more resources to which the at least one centrally accessible policy item applies;

an act of protecting the file according to the protection policy; and an act of attaching the policy handle to the file so that the file includes the policy handle, such that the protection policy is consistently accessed and applied by protection software at one or more other computer systems subsequently receiving and accessing the file, based on the protection software at the one or more other computer systems sending the policy handle attached to the file to the central policy database and receiving the protection policy from the central policy database in reply.

2. The storage devices as recited in claim 1, wherein some of the plurality of centrally accessible policy items contain code that can be used to derive a protection policy.

3. The storage devices as recited in claim 1, wherein some of the plurality of centrally accessible policy items contain a corresponding friendly name used to indicate the purpose of the protection policy.

4. The storage devices as recited in claim 1, wherein the central policy database also stores a policy selection policy that maps policy context data to one or more of protection policies of the plurality of centrally accessible policy items or policy handles of the plurality of centrally accessible policy items.

5. The storage devices as recited in claim 1, wherein the policy identification module is configured to identify one or more of the plurality of centrally accessible policy items stored in the central policy database that apply to a particular resource based on received resource context data.

6. The storage device devices as recited in claim 1, wherein the policy identification module is configured to:
receive particular resource context data for a particular resource;
compare the received particular resource context data to policy context data corresponding to each of the plurality of centrally accessible policy items stored in the central policy database;
based on the comparisons, identify one or more particular protection policies that are potentially appropriate for protecting the particular resource; and
return the one or more particular protection policies.

7. The storage devices as recited in claim 1, wherein the policy identification module is configured to identify protection policies stored in central policy database that apply to a particular resource based on received policy handles.

8. The storage devices as recited in claim 7, wherein the policy identification module is configured to:
receive a particular policy handle attached to a particular resource;
compare the received particular policy handle to policy handles corresponding to each of the plurality of centrally accessible policy items stored in the central policy database;
identify a particular centrally accessible policy item having the particular policy handle; and return a particular protection policy corresponding to the particular centrally accessible policy item, the particular protection policy for protecting the particular resource.

9. At a computer system that includes at least one processor and system memory, a method for consistently protecting resources of an organization, the method comprising:
an act of accessing an indication that a specified resource of the organization is to be protected for use at the computer system, the specified resource comprising a file;
an act of determining that the file lacks a handle pointing to a protection policy for the file;
based on the file lacking the handle, an act of accessing resource context data for the file, the resource context data indicating one or more properties of the file;
an act of accessing a policy selection policy from a central policy database for the organization, the policy selection policy indicating one or more protection policies within the central policy database that can be applied to corresponding resources based on resource context of the corresponding resources, so that the one or more protection policies are consistently applied to the corresponding resources of the organization when the corresponding resources of the organization are utilized, the policy selection policy indicating one or more protection policies that can be applied to the file based on the accessed resource context data for the file;
based on accessing the policy selection policy, an act of identifying the one or more appropriate protection policies to apply to the file based on the indications in the policy selection policy and based on the accessed resource context data for the file;
subsequent to identifying the one or more appropriate protection policies, an act of receiving a selection of at least one of the one or more appropriate protection policies to apply to the file;
an act of protecting the file according to the least one of the one or more appropriate protection policies; and
an act of attaching the handle to the file, such that the file identifies the at least one of the one or more appropriate protection policies through the handle, and such that the at least one of the one or more appropriate protection policies is consistently applied by one or more other computer systems subsequently accessing the file based on the one or more other computer systems using the handle attached to the file to retrieve the at least one of the one or more appropriate protection policies from the central policy database.

10. The method as recited in claim 9, wherein the act of accessing an indication that a specified resource of the organization is to be protected for use at the computer system comprises an act of protection software at the computer system accessing an indication that a specified resource of the organization is to be protected.

11. The method as recited in claim 9, wherein the act of accessing resource context data for the specified resource, the resource context data indicating one or more properties of the file comprises an act of formulating resource context data based on a document class of the file.

12. The method as recited in claim 9, wherein the act of accessing a policy selection policy from a central policy database for the organization comprises:
an act of sending a protection request to a central repository housing the central policy database; and
an act of receiving the policy selection policy from the central repository in response to the protection request.

13. The method as recited in claim 9, wherein the act of identifying one or more appropriate protection policies to apply to the file comprises an act of identifying a plurality of appropriate protection policies to apply to the file.

14. The method as recited in claim 9, wherein the act of receiving a selection of at least one of the one or more appropriate protection policies to apply to the file comprises an act of receiving a selection of plurality of appropriate protection policies to apply to the file.

15. The method as recited in claim 9, further comprising:
subsequent to attaching the handle to the file, an act of accessing the file;
an act of identifying that the handle is attached to the file;
an act of retrieving the at least one of the one or more appropriate protection policies to apply to the file from the central policy database based on the handle, the at least one of the one or more appropriate protection policies having been updated at the central policy database; and
an act of protecting the file in accordance with the updated at least one of the one or more appropriate protection policies identified by the handle.

16. The method as recited in claim 9, further comprising:
an act of sending the file, including the attached handle, to one or more other computer systems, which retrieves the at least one of the one or more appropriate protection policies to apply to the file from the central policy database based on the handle.

17. A resource protection system, the resource protection system including:
a central repository, the central repository including
a policy database, the policy database including a plurality of policy items, each policy item including:
a protection policy that instructs protection software how to protect one or more resources to which said policy item applies;
a policy handle that points to and uniquely references the protection policy so that the protection software can access the protection policy from the central repository based on the policy handle; and
policy context data that indicates one or more resource contexts in which a particular resource is one of the one or more resources to which said policy item applies; and
a policy identification module, the policy identification module configured to:
receive resource context data from the protection software, the resource context data corresponding to resources that the protection software is requested to protect;
compare the resource context data to policy context data of the plurality of policy items in the central repository;
based on the comparisons, identify one or more protection policies that are potentially appropriate for protecting the resource; and
return the policy handle for each of the one or more identified protection policies to the protection software; and
a plurality of computer systems that consistently protect resources, each computer system including:
one or more processors;
one or more computer storage devices having stored thereon protection software, the protection software configured to:
access a file resource that is to be protected;
formulate resource context data corresponding to the file resource, the resource context data indicating one or more properties of the file resource;
send the resource context data to the central repository to request a protection policy for protecting the file resource;
receive one or one more protection policies from the central repository, the one or one more received protection policies identified as potential protection policies for protecting the file resource;
select a specified protection policy, from among the one or more received protection policies, to protect the file resource;
protect the file resource in accordance with the specified protection policy; and
attach at least a handle to the file resource that indirectly points to the specified protection policy at the central repository, such that a different computer system receiving the accessed file resource provides consistent protection for the file resource by obtaining the specified protection policy from the central repository using the attached handle and by protecting the file resource in accordance with the specified protection policy.

* * * * *

UNITED STATES PATENT AND TRADEMARK OFFICE
CERTIFICATE OF CORRECTION

PATENT NO. : 8,141,129 B2  
APPLICATION NO. : 12/129577  
DATED : March 20, 2012  
INVENTOR(S) : Ray et al.

Page 1 of 1

It is certified that error appears in the above-identified patent and that said Letters Patent is hereby corrected as shown below:

In the Specification

In column 3, line 10, delete "the a" and insert -- the --, therefor.

In the Claims

In column 13, line 42, In Claim 6, after "storage" delete "device".

In column 14, line 36, In Claim 9, before "least" insert -- at --.

In column 15, line 24, In Claim 16, before "one or more" insert -- one of the --.

Signed and Sealed this  
Third Day of February, 2015

Michelle K. Lee  
*Deputy Director of the United States Patent and Trademark Office*